United States Patent
Clark et al.

(10) Patent No.: US 10,572,589 B2
(45) Date of Patent: *Feb. 25, 2020

(54) COGNITIVE MATCHING OF NARRATIVE DATA

(71) Applicant: International Business Machines Corporation, Armonk, NY (US)

(72) Inventors: Adam T. Clark, Mantorville, MN (US); Jeffrey K. Huebert, Rochester, MN (US); Aspen L. Payton, Byron, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 510 days.

This patent is subject to a terminal disclaimer.

(21) Appl. No.: 14/537,182

(22) Filed: Nov. 10, 2014

(65) Prior Publication Data
US 2016/0132591 A1 May 12, 2016

(51) Int. Cl.
*G06F 17/27* (2006.01)
*G06N 20/00* (2019.01)
*G06F 16/248* (2019.01)
*G06F 16/33* (2019.01)

(52) U.S. Cl.
CPC ........ *G06F 17/2785* (2013.01); *G06F 16/248* (2019.01); *G06F 16/3344* (2019.01); *G06F 17/2705* (2013.01); *G06N 20/00* (2019.01)

(58) Field of Classification Search
CPC .................. G06F 17/2785; G06F 17/30684
See application file for complete search history.

(56) References Cited

U.S. PATENT DOCUMENTS

| | | | |
|---|---|---|---|
| 6,272,495 B1* | 8/2001 | Hetherington | G06F 17/30684 |
| 8,024,311 B2 | 9/2011 | Wood et al. | |
| 8,374,848 B1 | 2/2013 | Birnbaum et al. | |
| 9,053,640 B1* | 6/2015 | Hendricks | G06F 17/21 |
| 2004/0006567 A1* | 1/2004 | Kurtz | G06F 17/30722 |
| 2004/0059736 A1* | 3/2004 | Willse | G06F 17/27 |
| 2006/0106769 A1* | 5/2006 | Gibbs | G06F 17/276 |
| 2009/0048927 A1* | 2/2009 | Gross | G06F 17/30867 705/14.42 |
| 2009/0248399 A1* | 10/2009 | Au | G06F 17/27 704/9 |
| 2009/0281906 A1* | 11/2009 | Cai | G06Q 10/06 705/26.1 |

(Continued)

OTHER PUBLICATIONS

Furtado, A., et al., "Plots of Narratives over Temporal Databases", Proceedings of the Eighth International Workshop on Database and Expert Systems Applications, 1997. IEEE Conference Publications, pp. 590-595. DOI: 10.1109/DEXA.1997.617379.

(Continued)

*Primary Examiner* — Neveen Abel Jalil
*Assistant Examiner* — Katriel Y Chiu
(74) *Attorney, Agent, or Firm* — James L. Olsen (57) ABSTRACT

A computer-implemented method for cognitive matching of narrative data may include collecting a set of data for a party and determining, by analyzing the set of data, an identifiable event for the party. In addition, the method may include identifying, using the identifiable event, a relevant feature of a corpus and providing an output corresponding to the relevant feature.

3 Claims, 4 Drawing Sheets

(56) References Cited

U.S. PATENT DOCUMENTS

| | | | |
|---|---|---|---|
| 2010/0205179 A1* | 8/2010 | Carson | G06F 17/30867 707/740 |
| 2011/0301941 A1* | 12/2011 | De Vocht | G06F 17/2715 704/9 |
| 2012/0166180 A1* | 6/2012 | Au | G06F 17/274 704/9 |
| 2013/0073976 A1 | 3/2013 | McDonald et al. | |
| 2013/0227382 A1* | 8/2013 | Boulila | G06F 8/10 715/201 |
| 2014/0040244 A1* | 2/2014 | Rubinstein | G06F 17/30528 707/722 |
| 2014/0095150 A1 | 4/2014 | Berjikly et al. | |
| 2014/0156437 A1 | 6/2014 | Baran et al. | |
| 2014/0189501 A1* | 7/2014 | Demiralp | G06F 17/2235 715/243 |
| 2014/0189524 A1* | 7/2014 | Murarka | G06Q 50/01 715/744 |
| 2014/0214905 A1 | 7/2014 | Osborne et al. | |
| 2014/0324717 A1* | 10/2014 | Ayers | G06Q 50/01 705/319 |
| 2015/0149461 A1* | 5/2015 | Aguilar Lemarroy | G06F 16/35 707/737 |
| 2015/0193889 A1* | 7/2015 | Garg | G06Q 50/01 705/14.49 |
| 2015/0220774 A1* | 8/2015 | Ebersman | G06K 9/00308 382/118 |
| 2015/0339270 A1* | 11/2015 | Morton | G06F 3/0483 715/203 |

OTHER PUBLICATIONS

Whitehouse, T., et al., "Need to Know", www.complianceweek.com, Aug. 2014. p. 8.

Clark, A,. et al., "Cognitive Matching of Narrative Data", U.S. Appl. No. 14/661,351, filed Mar. 18, 2015.

List of IBM Patents or Patent Applications Treated As Related.

\* cited by examiner

COGNITIVE MATCHING OF NARRATIVE DATA

BACKGROUND

The present disclosure relates to computer systems, and more specifically, to cognitive matching of narrative data.

The amount of data available on the Internet and other communication networks is growing rapidly. Content including narratives and stories, such as books, films, and the like are examples of content available to users. As the amount of available information increases, the need for managing content including narratives and stories may also increase.

SUMMARY

Aspects of the present disclosure, in certain embodiments, are directed toward cognitive matching of narrative data. Aspects of the present disclosure are directed toward collecting a set of data for a party. Aspects also include determining, by analyzing the set of data, an identifiable event for the party. Aspects also include identifying, using the identifiable event, a relevant feature of a corpus. Aspects also include providing an output corresponding to the relevant feature.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to various embodiments of a system and method for cognitive matching of narrative data. More particular aspects relate to identifying a relevant feature of a corpus using an identifiable event for a party. The method may include collecting a set of data for the party. The method may also include determining, by analyzing the set of data, an identifiable event for the party. The method may also include identifying, using the identifiable event, a relevant feature of the corpus. The method may also include providing an output corresponding to the relevant feature.

In recent years, the increased availability and access to large amounts of content via the Internet, social media, and other networks have resulted in an increase in the need for organizing and evaluating that content. Narrative content (e.g., content including stories, both fiction and non-fiction) in the form of books, movies, electronic games, comics, music, audio files and the like are examples of the content that is available to users. Aspects of the present disclosure are directed toward the recognition that certain narrative content (e.g., books, movies, electronic games, and the like) may be particularly entertaining, informative, useful, or otherwise beneficial to a given user based on his or her own life events and experiences. For instance, a story about a character who grew up in a first country and moved to a second country in his or her teenage years may be particularly interesting, meaningful, or helpful for a user who has had similar life experiences. Accordingly, aspects of the present disclosure, in certain embodiments, are directed toward determining a life event or experience (e.g., an identifiable feature) for a user based on collected data for the user, identifying a narrative feature (e.g., a relevant feature) of a corpus of narrative content based on the life event or experience, and providing narrative content to the user based on the relevant feature. Aspects of the present disclosure may be associated with benefits including content relevance, time saving, and efficiency of content accessibility.

Aspects of the present disclosure relate to various embodiments of a system and method for cognitive matching of narrative data. More particular aspects relate to identifying a relevant feature of a corpus using an identifiable event for a party. In certain embodiments, the party may be a user. The method and system may work on a number of devices and operating systems. Aspects of the present disclosure, in certain embodiments, include collecting a set of data for the party. Collecting the set of data for the party may include aggregating user generated data from sources such as web pages, user profiles, social media, user comments, blogs, and the like.

In certain embodiments, the method may include determining, by analyzing the set of data, an identifiable event for the party. Determining the identifiable event for the party may include extracting metadata from the set of data. Based on the metadata of the set of data, the method may further include determining a prominence factor of the set of data. The method may also include ascertaining that the prominence factor of the set of data achieves a first prominence criterion. Further, in certain embodiments, determining the identifiable event for the party may include parsing, by a natural language processing technique configured to analyze semantic and syntactic content, unstructured data of the set of data. From the unstructured data of the set of data, the method may identify a set of story elements. Further, using the natural language processing technique, the method may include extracting a sentiment feature coupled with the set of story elements. Using the sentiment feature and the set of story elements, the method may include establishing a framework component.

In certain embodiments, the method may include using the identifiable event to identify a relevant feature of a corpus. The corpus may include a narrative content database having one or more types of narrative content. For instance, the narrative content may include literature data, film data, television data, audio data, electronic game data, and the like. In certain embodiments, the narrative content may be structured in a set of ontological relationships. In certain embodiments, identifying the relevant feature of the corpus includes comparing a framework component to narrative content of a narrative content database. Based on the set of story elements and a sentiment feature of the framework component and a set of ontological relationships of the narrative content, the method may include determining the relevant feature corresponding to the identifiable event.

In certain embodiments, the method may include providing an output corresponding to the relevant feature. In certain embodiments, providing the output corresponding to the relevant feature may include generating, based on the relevant feature, a set of content suggestions. The method may also include transmitting the set of content suggestions (e.g., to a party or a user). In certain embodiments, the method may include assigning a confidence score to the set of content suggestions based on a relationship between the framework component and the relevant feature. In certain embodiments, the method may also include receiving a set of user ratings for the output. Using a machine learning technique configured to process the set of user ratings for the output, the method may also include defining a decision parameter for identifying the relevant feature of the corpus.

Figure 1:
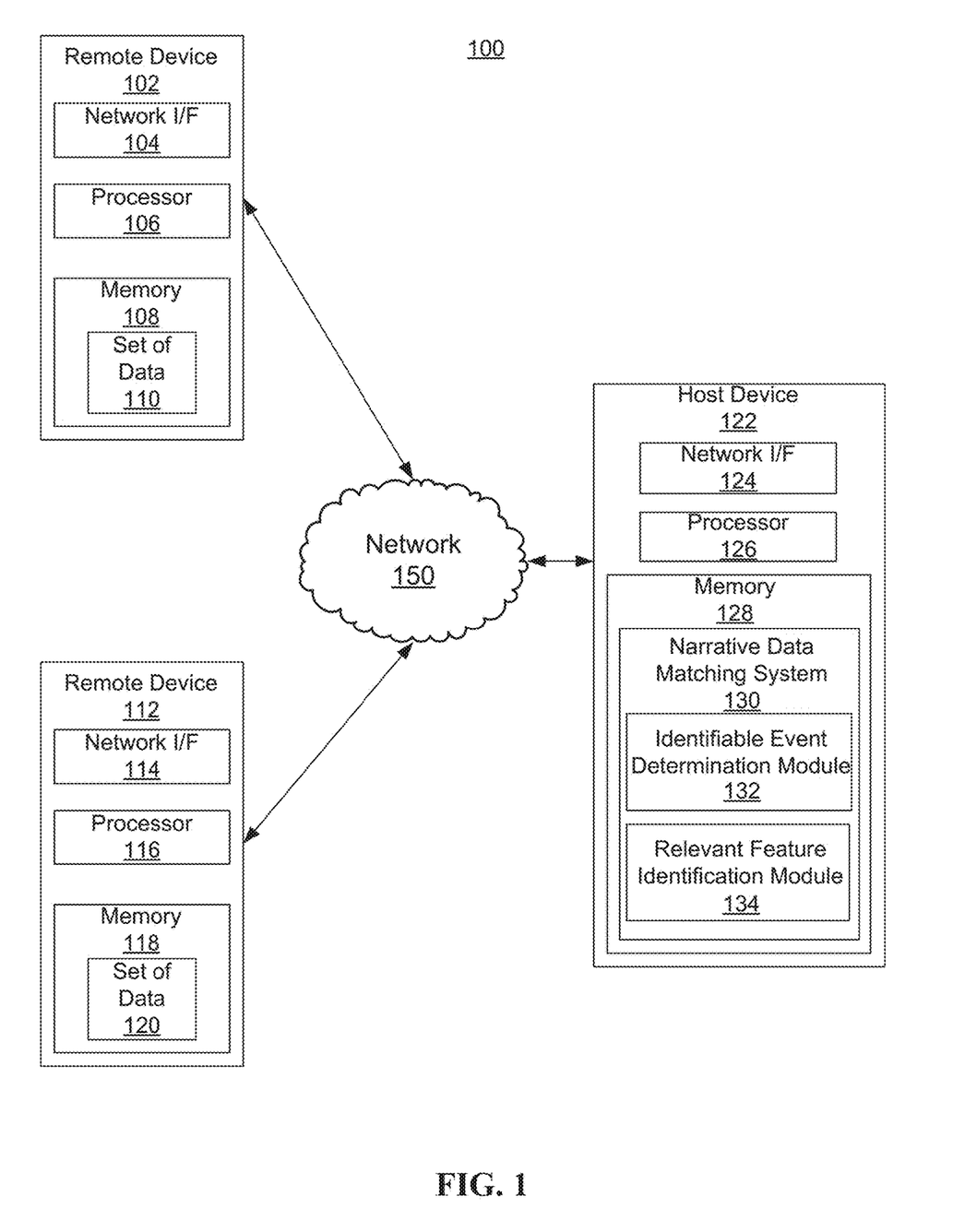
FIG. 1 is a diagrammatic illustration of an example computing environment, according to embodiments.

Turning now to the figures, FIG. 1 is a diagrammatic illustration of an example computing environment 100, consistent with embodiments of the present disclosure. In certain embodiments, the environment 100 can include one or more remote devices 102, 112 and one or more host devices 122. Remote devices 102, 112 and host device 122 may be distant from each other and communicate over a network 150 in which the host device 122 comprises a central hub from which remote devices 102, 112 can establish a communication connection. Alternatively, the host device and remote devices may be configured in any other suitable relationship (e.g., in a peer-to-peer or other relationship).

In certain embodiments the network 150 can be implemented by any number of any suitable communications media (e.g., wide area network (WAN), local area network (LAN), Internet, Intranet, etc.). Alternatively, remote devices 102, 112 and host devices 122 may be local to each other, and communicate via any appropriate local communication medium (e.g., local area network (LAN), hardwire, wireless link, Intranet, etc.). In certain embodiments, the network 150 can be implemented within a cloud computing environment, or using one or more cloud computing services. Consistent with various embodiments, a cloud computing environment can include a network-based, distributed data processing system that provides one or more cloud computing services. In certain embodiments, a cloud computing environment can include many computers, hundreds or thousands of them, disposed within one or more data centers and configured to share resources over the network.

In certain embodiments, host device 122 can include a narrative data matching system 130 (also referred to herein as a QA system or a cognitive system) having an identifiable event determination module 132 and a relevant feature identification module 134. In certain embodiments, the identifiable event determination module 132 may be configured to analyze a set of data collected from a user to determine an identifiable event for the user. In certain embodiments, the relevant feature identification module 134 may be configured to use the identifiable event to identify a relevant feature of a corpus.

In certain embodiments, remote devices 102, 112 may include a set of data 110, 120. The set of data may 110, 120 may be user generated data including web pages, user profiles, user statuses, comments, blogs, social media, or other types of data. In certain embodiments, as described herein, the set of data 110, 120 may be configured to be collected by the host device 122. In certain embodiments, the remote devices 102, 112 may be configured to transmit the set of data 110, 120 to the host device 122. The set of data 110, 120 may be analyzed to determine an identifiable event for a user, as described herein.

Consistent with various embodiments, host device 122 and remote devices 102, 112 may be computer systems preferably equipped with a display or monitor. In certain embodiments, the computer systems may include at least one processor 106, 116, 126 memories 108, 118, 128 and/or internal or external network interface or communications devices 104, 114, 124 (e.g., modem, network cards, etc.), optional input devices (e.g., a keyboard, mouse, or other input device), and other commercially available and custom software (e.g., browser software, communications software, server software, natural language processing software, search engine and/or web crawling software, filter modules for filtering content based upon predefined criteria, etc.). In certain embodiments, the computer systems may include server, desktop, laptop, and hand-held devices. In addition, the narrative data matching system 130 may include one or more modules or units to perform the various functions of present disclosure embodiments described below (e.g., collecting a set of data for a party, determining an identifiable event for the party, identifying a relevant feature of a corpus, and providing an output corresponding to the relevant feature) and may be implemented by a combination of other software and/or hardware modules or units.

Figure 2:
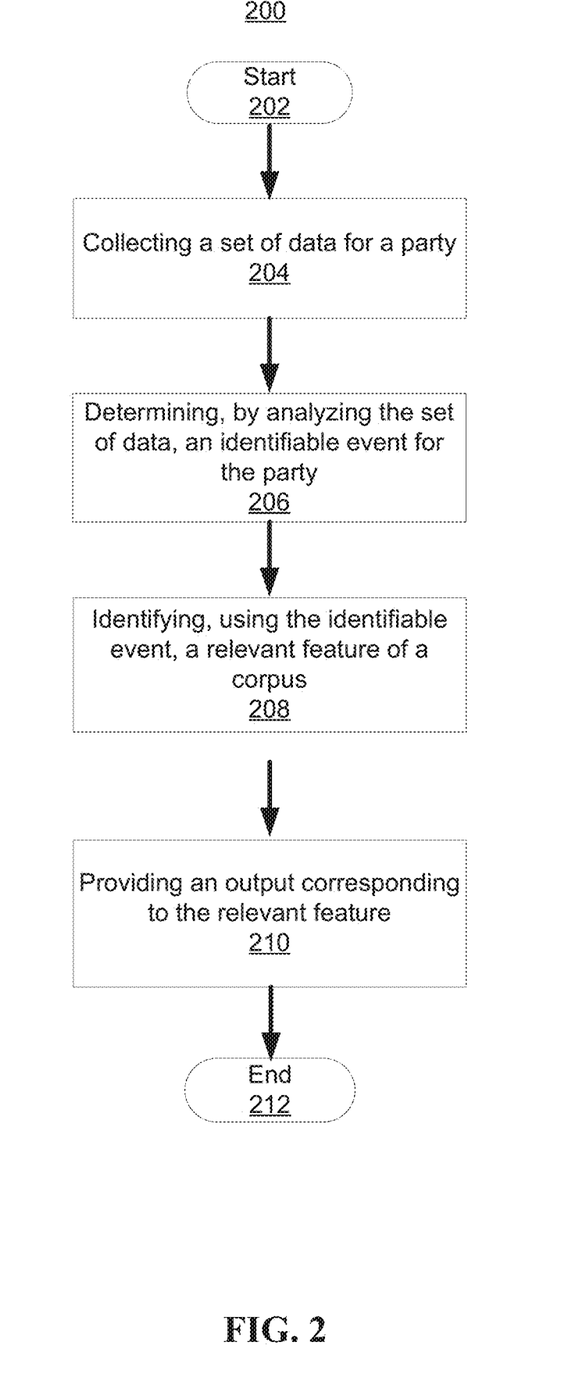
FIG. 2 is a flowchart illustrating a method for cognitive matching of narrative data, according to embodiments.

FIG. 2 is a flowchart illustrating a method 200 for cognitive matching of narrative data, consistent with embodiments of the present disclosure. Aspects of FIG. 2 are directed toward using an identifiable event of a party to determine a corresponding relevant feature of a corpus. The method 200 may begin at block 202 and end at block 212. Consistent with various embodiments, the method 200 may include a collecting block 204, a determining block 206, an identifying block 208, and a providing block 210.

Consistent with various embodiments, at block 204 the method 200 may include collecting a set of data for a party. In certain embodiments, the party may include a user, an organization, a group, or a company, as examples. Although reference is made herein to a user, it is understood that the user may be a party, individual, group, company, organization, or other entity. In certain embodiments of the present disclosure, collecting the set of data for the user may include aggregating user generated data from one or more sources. For example, the user generated data may be collected from sources including web pages, user profiles, social media, user statuses, comments, blogs, and the like. The user generated data may be one or more of a number of types of media, such as textual data, audio data, video data, and the like. The user generated data may include information regarding the experiences, occupation, hobbies, interests, background, education, and other information relating to the user. As an example, in certain embodiments, the set of data for the user may include a status update from a social media website such as "I had a great time fishing at Island Lake on Labor Day!" as well as a picture coupled with the status update. Other types of user generated data are also possible.

Consistent with various embodiments, at block 206 the method 200 may include determining, by analyzing the set of data, an identifiable event for the user (e.g., the party, individual, group, or other entity). Analyzing the set of data may include processing the set of data using one or more of a number of different techniques (e.g., algorithms) in order to determine the identifiable event for the user. In certain embodiments of the present disclosure, the identifiable event may be an occurrence of particular notability, relevance, or significance with respect to party user, group, company, or organization. In certain embodiments, the identifiable event may be a notable occurrence in the life of an individual. For example, in certain embodiments, the identifiable event may include a couple having a child. As additional examples, the identifiable event may include a student starting college, a company celebrating a milestone, an individual embarking on a trip, or the like. In certain embodiments, the identifiable event may be a shared event relevant to multiple parties. Other types of identifiable events are also possible.

As described herein, determining the identifiable event for the user may be performed in one of a number of ways. For instance, in certain embodiments, determining the identifiable event for the user may include extracting metadata from the set of data. The metadata may, for instance, include keywords, tags, identifiers, ratings, tokens, user feedback data, and the like. Based on the metadata of the set of data, the method 200 may include determining a prominence factor of the set of data. The prominence factor may be an integer value between 1 and 100 which indicates the relative importance, popularity, notability, or significance of the set of data. In certain embodiments, relatively low prominence factors (e.g., lower integers) may indicate relatively low importance, while relatively high prominence factors (e.g., higher integers) may indicate greater importance. The method 200 may also include ascertaining that the prominence factor of the set of data achieves a prominence criterion. The prominence criterion may include a fixed, predetermined integer value between 1 and 100 that represents a tolerance threshold for the prominence factor. In certain embodiments, a set of data with an associated prominence factor that is greater than the prominence criterion may be selected as including the identifiable event for the user.

As an example, consider that a set of data including a user status update is collected from a social media website. As described herein, the prominence criterion may be 70. The user status update may be a comment stating "My painting won first prize at the art contest!" Accordingly, in certain embodiments, the user status update may be commented on, reposted, or receive other indications of interaction from other users of the social media website. As described herein, the method 200 may include analyzing metadata associated with these interactions (e.g., comments, reposts, shares) and determining a prominence factor of 74 for the user status update. Accordingly, as the prominence factor is greater than the prominence criterion of 70, the user status update may be determined to be relatively significant, notable, or important with respect to the user.

Consistent with various embodiments, the prominence criterion for a particular user and a particular type of event may be determined based on contextual data about the user gathered from a user profile, database, or other repository of user data. For example, the prominence criterion may be generated based on data regarding the occupation, hobbies, interests, educational background, experiences, and other contextual data for the user. As an example, a user profile for a first user may indicate that the user takes frequent international business trips to many different countries throughout the world. The method 200 may determine that, as international travel is a frequent and standard event for the first user, that international travel is not particularly notable or out of the ordinary for the first user. Accordingly, the prominence criterion for the first user may be higher (e.g., a greater integer value) with regard to international travel (e.g., a given set of data pertaining to international travel may need to receive more comments, reposts, and interactions from other users to be identified as notable or significant for the first user). For example, the prominence criterion for the first user with regard to international travel may be determined to be 90. As an additional example, in certain embodiments, a user profile for a second user may indicate that the second user has never left his or her country, but has a long-cherished dream to visit another country (e.g., a blog post by the user indicates he or she has always wished to travel). Accordingly, the prominence criterion for the second user may be lower (e.g., a lower integer value) with regard to international travel (e.g., a given set of data pertaining to international travel need not receive as many comments, reposts, and interactions from other users to be identified as significant for the second user). For example, the prominence criterion for the second user may be determined to be 40. In certain embodiments, the prominence criterion may be user determined (e.g., a user may define a prominence criterion based on what he or she considers relevant, important, or notable).

Consistent with various embodiments, determining the identifiable event for the user may also include parsing unstructured data of the set of data using a natural language processing technique configured to analyze semantic and syntactic content. In certain embodiments, the unstructured data may include textual content included in the set of data, such as words, phrases, dates, numbers, sentences and the like. In certain embodiments, the unstructured data may contain information regarding the events, interests, hobbies, or life experiences of a user. In certain embodiments, the unstructured data may be coupled with metadata that has been determined to have a prominence factor achieving a prominence criterion. As described herein, aspects of the present disclosure are directed toward parsing the unstructured data with a natural language processing technique to identify a set of story elements. The set of story elements may include one or more aspects of the unstructured data that indicate a characteristic of a story or narrative. In certain embodiments, the set of story elements may include setting, plot, characters, conflict, and theme. More particularly, the natural language processing technique may be configured to analyze the unstructured data of the set of data and determine one or more of a location (e.g., setting), events (e.g., plot), individuals involved, (e.g., characters), problems (e.g., conflict), and a central topic (e.g., theme). In certain embodiments, the set of story elements may be derived using multiple portions of unstructured data from different data of the set of data (e.g., a setting/location may be identified from a user profile, while events/plot are identified from a user status update on a social media website).

As described herein, the set of story elements may be identified by a natural language processing technique configured to analyze semantic and syntactic content of the unstructured data of the set of data. In certain embodiments, the natural language processing technique may be a software tool, widget, or other program configured to determine the set of story elements from the unstructured data. More particularly, the natural language processing technique can be configured to parse a semantic feature and a syntactic feature of the unstructured data. The natural language processing technique can be configured to recognize keywords, contextual information, and metadata tags associated with one or more portions of the set of data. In certain embodiments, the natural language processing technique can be configured to analyze summary information, keywords, figure captions, or text descriptions included in the set of data, and use syntactic and semantic elements present in this information to identify the set of story elements. The syntactic and semantic elements can include information such as word frequency, word meanings, text font, italics, hyperlinks, proper names, noun phrases, parts-of-speech, or the context of surrounding words. Other syntactic and semantic elements are also possible. Based on the analyzed metadata, contextual information, syntactic and semantic elements, and other data, the natural language processing technique can be configured to determine the set of story elements for a set of data.

In certain embodiments, the method 200 may include extracting from the set of data (more particularly, the unstructured data of the set of data) a sentiment feature coupled with the set of story elements. The sentiment feature may include an attitude, position, opinion, or emotion expressed in conjunction with the set of story elements. In certain embodiments, multiple sentiment features may be extracted from the set of data. As described herein, in certain embodiments, the sentiment feature may be extracted by a natural language processing technique configured to analyze contextual information, linguistic data, and semantic elements of the set of data. As an example, the natural language processing technique may identify words associated with one or more emotions (e.g., the word "glad" may be associated with "happiness," the word "uncertain" may be associated with "confused," or vice versa), analyze the semantic and syntactic usage and context of the words, and determine one or more sentiment features for the set of story elements. For instance, in certain embodiments, the natural language processing may parse unstructured data of the set of data in the form of a user comment stating "My walk in the park this morning was delightful!" and identify the word "delightful" as being associated with the emotion of "happiness." Accordingly, in certain embodiments, the method 200 may include determining and extracting a sentiment feature of "happiness" for the set of data. Further, the method 200 may identify that the sentiment feature of "happiness" is associated with a setting/location of "the park this morning." Additionally, in certain embodiments, the natural language processing technique may determine the sentiment feature by analyzing marks or symbols associated with the set of data (e.g., emoji, ideograms, pictographs, emoticons, and the like).

In certain embodiments, the method 200 may be configured to infer the sentiment feature from other characteristics of the set of story elements when the sentiment is not stated explicitly. As an example, consider a user status update on a social media website stating "I was one point away from winning my fencing match today. So close!" The natural language processing technique may be configured to parse the sentence and determine that the poster of the comment lost an event, an experience often associated with disappointment. Accordingly, the method 200 may extract a sentiment feature of "disappointment" for the set of data. Other methods of identifying the sentiment feature are also possible.

In certain embodiments, the method 200 may include using the set of story elements and the sentiment feature to establish a framework component. The framework component may include an outline or synopsis of the set of story elements and corresponding sentiment features. In certain embodiments, establishing the framework component may include matching each story element of the set of story elements with an extracted sentiment feature. For instance, for a user status update that states "The Grand Canyon is beautiful, but I'm still mad at Jeff for breaking my camera," the natural language processing technique may extract a first sentiment feature of "Admiration" and match it with a story element of "Setting-Grand Canyon," as well as a second sentiment feature of "Anger" and match it with a story element of "Character-Jeff." In certain embodiments, establishing the framework component may include determining an overall sentiment feature for the entire set of story elements.

Consider the following example. The method 200 may include collecting a set of data for a user including a picture with an attached comment, a user profile, and three user status updates from a social media site. The first user status update may state "Tomorrow I interview for a position at ACME Corporation! I've heard it's pretty competitive . . . I hope it goes alright!" The natural language processing technique may analyze the first user status update and determine an identifiable event of "Job Interview" for the user, as well as a story element of "Setting: ACME Corporation Headquarters." Further, the natural language processing technique may extract a sentiment feature of "nervousness" from the first user status update. The second user status update may state "So far so good! They seem to be looking for someone with a solid network security background." In certain embodiments, as described herein, the natural language processing technique may analyze the user profile, and determine that the user has over 15 years of experience in network security. Based on the user profile and the second user status update, the method 200 may extract a sentiment feature of "Positive/Hopeful" from the second user status update (e.g., the user may feel confidence about the job interview because of his or her background in network security). The third user status update may state "Just got done. I feel like I did the best I could have." From the third user status update, the natural language processing technique may extract a sentiment feature of "Satisfaction." In certain embodiments, the picture may be a picture of the user and a second individual shaking hands in front of the ACME Corporation Headquarters building. The comment attached to the picture may state "I'm just about to start my first day at work! Couldn't be more thankful for this opportunity!" Accordingly, the natural language processing technique may analyze metadata about the picture (e.g., name tags associated with the individuals) and determine that the second individual is the CEO of ACME Corporation. Further, the natural language processing technique may extract a sentiment feature of "gratitude" with respect to the second individual and ACME Corporation. As described herein, the method 200 may include establishing a framework component using the identified story elements and extracted sentiment features.

Consistent with various embodiments, at block 208 the method 200 may include identifying, using the identifiable event, a relevant feature of a corpus. The corpus may include a narrative content database having one or more types of narrative content selected from a group consisting of one or more types of media. For instance, in certain embodiments, the corpus may include narrative content such as literature data, film data, television data, audio data, and electronic game data. Other types of narrative content are also possible. Generally, the narrative content may include fictional stories, non-fiction stories, documentaries, biographies, autobiographies, and other accounts, both fictional and non-fictional. In certain embodiments, the narrative content of the corpus may be structured in a set of ontological relationships. The ontological relationships may include predetermined formalized connections or links between concepts within the corpus. In certain embodiments, the ontological relationships may link narrative content of the corpus with one or more features of the set of data for the user. In certain embodiments, the narrative content may be tagged and organized based on the type of content, user statistics (e.g., more frequently referenced content may be given a higher priority), and the narrative characteristics of the content. For example, in certain embodiments, the narrative content may be categorized based on the setting, themes, characters, plot, and conflict of the story.

Consistent with various embodiments, identifying the relevant feature of the corpus may include comparing the framework component (e.g., the framework component established using the set of story elements and the sentiment feature) with the narrative content of the narrative content database. Comparing the framework component with the narrative content of the narrative content database may include examining the set of story elements and the sentiment features of the framework component in relation to the ontological relationships, tags, and categories of the narrative content. In response to comparing the framework component with the narrative content, the method 200 may include determining, based on the set of story elements and the sentiment feature of the framework component and the set of ontological relationships of the narrative content, a relevant feature corresponding to the identifiable event. In certain embodiments, the relevant feature may be one or more story elements (e.g., theme, character, setting, plot, conflict) of the narrative content that are similar (e.g., a similarity value greater than a similarity threshold) to one or more story elements of the framework component. For example, the relevant feature may be "Setting-London" in response to determining that a location included in both the set of data and the narrative content is London. As an additional example, the relevant feature may be "Character-Impetuous, spirited woman who thirsts for adventure," in response to determining that a character meeting the above description is included in both the set of data and the narrative content. Additionally, the relevant feature may include a sentiment feature that is similar to a sentiment feature of the framework component. For example, in certain embodiments, the relevant feature may be "Emotion-joy" in response to determining that the emotion of "joy" is included in both the set of data and the narrative content. In certain embodiments, the relevant feature may be a complex relationship between a combination of multiple story elements and sentiment features that are substantially similar between the narrative content and the framework component. For instance, as an example, the method 200 may include determining a relevant feature such as "a downtrodden individual seeking acceptance from those around him/her by atoning for past mistakes through social activism and volunteering activities in impoverished areas," in response to identifying similar story elements and sentiment features in the framework component.

Consistent with various embodiments, at block 210 the method 200 can include providing an output corresponding to the relevant feature. In certain embodiments, providing the output can include transmitting, presenting, or otherwise making the output available to the user (e.g., the party, organization, company, or other entity). For example, the output may be provided to the user in the form of an electronic report delivered to the email address of the user. In certain embodiments, the output may be provided in the form of a message delivered to a mobile device of the user. In certain embodiments, the output may be provided to another party other than the party for whom the identifiable event was determined. As an example, in certain embodiments, the identifiable event may be determined for a first party, and the output may be provided to a second party distinct from the first party. In certain embodiments, the output may be provided to multiple parties other than the party for whom the identifiable event was determined. Other methods of providing the output corresponding to the relevant feature are also possible.

In certain embodiments, providing the output corresponding to the relevant feature may include generating, based on the relevant feature, a set of content suggestions. The set of content suggestions may include books, films, music, electronic games, comics, blogs, audio recordings, or other narrative content media that includes the relevant feature identified using the identifiable event. In certain embodiments, the set of content suggestions may include the name of the author, director, artist, release date, and/or a synopsis for each item in the set. In response to generating the set of content suggestions, the method 200 may include transmitting the set of content suggestions to a user (e.g., via an electronic message to an email address, mobile device, or the like). In certain embodiments, the set of content suggestions may also include a means to access the suggested content. As an example, the set of content suggestions may include a list of local libraries where a particular book can be borrowed, a link to an online store where the content can be purchased, or a means of obtaining the content directly (e.g., internet streaming service or digital file download).

In certain embodiments, the method 200 may include assigning a confidence score to the set of content suggestions based on a relationship between the framework component and the relevant feature. The confidence score may, for instance, be an integer value between 1 and 100 that indicates the relative similarity between the set of story elements and the sentiment feature of the framework component and the determined relevant feature of the corpus. In certain embodiments, the similarity between the relative feature and the framework component may be assessed using the categories, tags, and ontological relationships of the corpus, and metadata, tags, keywords, and other information associated with the framework component. As an example, in certain embodiments, the set of content suggestions may include a first book having a confidence score of 65, a second book having a confidence score of 81, a film having a confidence score of 79, and an audio recording have a confidence score of 54.

In certain embodiments, the method 200 may include receiving a set of user ratings for the output. The set of user ratings may include qualitative and quantitative data that is directed toward an evaluation or assessment of the relative quality or merit of the set of content suggestions. As an example, the set of user ratings may allow a user to select one of a number of pre-determined elements to rate the set of content suggestions (e.g., 3.5 out of 5 stars, 6.7 out of 10 points). In certain embodiments, the set of user ratings may allow the user to submit comments, remarks, or other opinions in the form of a review for the set of content suggestions. In certain embodiments, the method 200 may include using a machine learning technique configured to process the set of user ratings for the output (e.g., the set of content suggestions) and define a decision parameter for identifying the relevant feature of the corpus. As an example, the method 200 may analyze the set of user ratings, and determine that the user is particularly interested in content suggestions that include science-fiction settings. Accordingly, the method 200 may include building a user preferences profile for the user using this information, and selecting content suggestions containing science-fiction settings more frequently. Additionally, the method 200 may also include giving content suggestions with science-fiction settings greater confidence scores based on the preferences of the user. Other methods of developing user preferences for the set of content suggestions are also possible.

Consider the following example. The method 200 may include collecting a set of data for a user including a picture with an attached comment and five social media status updates. The first social media status update may include a statement such as "Tomorrow I start my first day of college!" The second social media status update may include a statement such as "It's already the third week of class, and I haven't made it to a single one of my morning classes yet." The third social media status update may include a statement such as "I missed the deadline for my midterm paper. My grades aren't looking very good." The fourth social media status update may include a statement such as "I've really started to work harder. Going to talk to my professor about the outline for my next paper." The fifth social media status update may include a statement such as "Spent all weekend studying for my finals. Here goes!" The picture may depict the user standing with a second individual and holding a plaque. The comment attached to the picture may include a statement such as "Despite a rough start, I finished the semester with straight A's, and got an award in academic achievement from my professor!"

Accordingly, as described herein, the method 200 may include analyzing the set of data and determining an identifiable event for a user. The identifiable event may, for example, be determined to be "academic struggle." Determining the identifiable event may also include identifying a set of story elements (e.g., plot, conflict, theme, characters, setting). As an example, in certain embodiments, the set of story elements may include a theme such as "Personal journey to overcome adversity, atone for past mistakes, and achieve success." Using the identified theme, the method 200 may include identifying a relevant feature of a narrative content corpus. As an example, the relevant feature may be a theme similar to that identified based on the identifiable event, contained in a book, film, electronic game, or other narrative medium. As described herein, the method 200 may include providing a set of content suggestions to the user based on the relevant feature. For instance, in certain embodiments, in the case of the present example, the method 200 may include suggesting the Divine Comedy by Dante Alighieri (e.g., the main character experiences a journey with a theme similar to overcoming adversity, atoning for past mistakes, and achieving success). The method 200 may also include suggesting a biographical account of Isaac Newton (e.g., Isaac Newton struggled academically before achieving success). Other narrative content suggestions are also possible.

Figure 3:
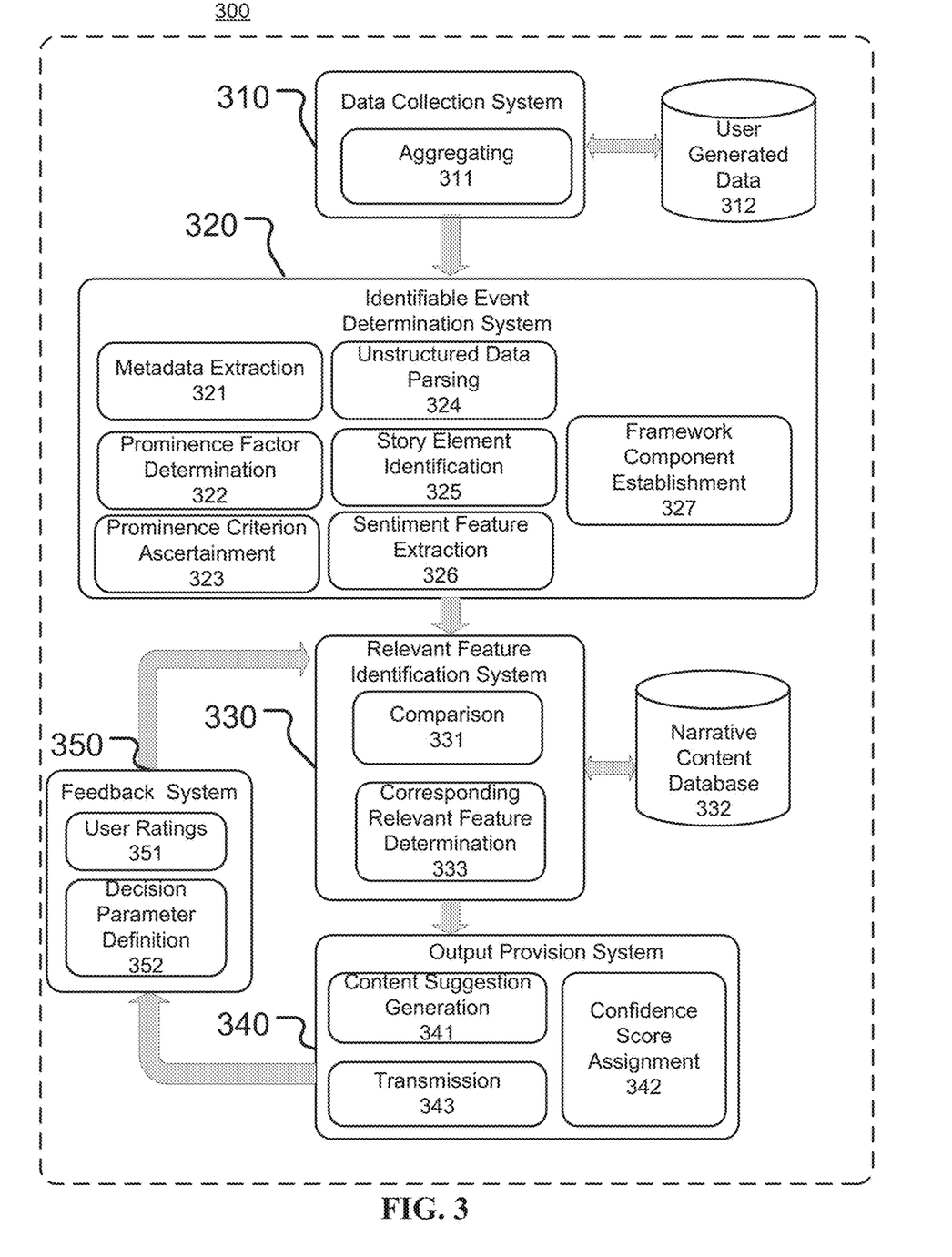
FIG. 3 is a diagram illustrating an example system architecture for cognitive matching of narrative data, according to embodiments.

FIG. 3 is a diagram illustrating an example system architecture 300 for cognitive matching of narrative data, consistent with embodiments of the present disclosure. Aspects of FIG. 3 are directed toward determining an identifiable event from data collected from a user, identifying a relevant feature from a corpus of narrative content using the identifiable event, and providing an output to the user based on the relevant feature. As shown in FIG. 3, in certain embodiments, the example system architecture 300 can include a data collection system 310, an aggregating module 311, user generated data 312, an identifiable event determination system 320, a metadata extraction module 321, a prominence factor determination module 322, a prominence criterion ascertainment module 323, an unstructured data parsing module 324, a story element identification module 325, a sentiment feature extraction module 326, a framework component establishment module 327, a relevant feature identification system 330, a comparison module 331, a corresponding relevant feature determination module 333, a narrative content database 332, an output provision system 340, a content suggestion generation module 341, a confidence score assignment module 342, a transmission module 343, a feedback system 350, a user ratings module 351, and a decision parameter definition module 352.

Consistent with various embodiments, the data collection system 310 of FIG. 3 may substantially correspond with collecting block 204 of FIG. 2. In certain embodiments, the aggregating module 311 may be configured to gather user generated data 312 from sources including web pages, user profiles, social media, user statuses, comments, blogs, and the like. The user generated data 312 may be one or more of a number of types of media, such as textual data, audio data, video data, and the like. The user generated data 312 may include information regarding the experiences, occupation, hobbies, interests, background, education, and other information relating to the user. As shown in FIG. 3, in certain embodiments, the user generated data 312 may be stored on a database configured to be accessible to the data collection system 310.

Consistent with various embodiments, the identifiable event determination system 320 may substantially correspond with determining block 206 of method 200 as shown in FIG. 2. In certain embodiments, the metadata extraction module 321 may be configured to extract metadata (e.g., keywords, tags, user interaction data, re-post statistics, and the like) from the user generated data 312. The prominence factor determination module 322 may be configured to assign an integer value to the user generate data 312 to represent the relative importance, notability, popularity, or significance of the user generated data (e.g., user generated data interacted with by more users may be more notable). The prominence criterion ascertainment module 323 may be configured to ascertain whether the prominence factor is above a prominence criterion (e.g., a minimum threshold value). The unstructured data parsing module 324 may be configured to use a natural language processing technique to analyze textual data included in the set of data collected from the user. Based on the unstructured data, the story element identification module 325 may be configured to identify a set of story elements (e.g., setting, plot, theme, characters, conflict). The sentiment feature extraction module 326 may be configured to extract a sentiment (e.g., emotion, attitude, feeling) coupled with the story elements from the unstructured data. In certain embodiments, the framework component establishment module 327 may be configured to establish a framework component using the sentiment extracted by the sentiment feature extraction module 326 and the set of story elements identified by the store element identification module 325.

Consistent with various embodiments, the relevant feature identification system 330 may substantially correspond with the identifying block 208 of method 200 as shown in FIG. 2. In certain embodiments, the comparison module 331 may be configured to compare the framework component with narrative content. The narrative content may include literature data, film data, television data, audio data, and electronic game data. Other types of narrative content are also possible. Generally, the narrative content may include fictional stories, non-fiction stories, documentaries, biographies, autobiographies, and other accounts, both fictional and non-fictional. In certain embodiments, the narrative content may be stored on a narrative content database 332 that is configured to be accessible to the comparison module 331. In certain embodiments, the corresponding relevant feature determination module 333 may be configured to determine a relevant feature of the narrative content that corresponds to the identifiable feature of the set of data. For instance, the relevant feature may be determined to be substantially similar to the identifiable event based on the set of story elements and sentiment feature of the framework component.

Consistent with various embodiments, the output provision system 340 may substantially correspond with the providing block 210 of method 200 shown in FIG. 2. In certain embodiments, the content suggestion generation module 341 may be configured to generate a set of content suggestions for the user based on the relevant feature and the identifiable event of the user. For example, the content suggestions may include books, films, electronic games, comics, or other narrative content based on the relevant feature and the identifiable event. In certain embodiments, the confidence score assignment module 342 may be configured to generate a confidence score for the set of content suggestions. The confidence score may, for example, be an integer value that represents the relative similarity between the set of story elements and the sentiment feature of the framework component and the determined relevant feature of the corpus. In certain embodiments, the transmission module 343 may be configured to transmit the set of content suggestions to the user. For example, the set of content suggestions may be sent via an electronic mail message, a message delivered to a mobile device of the user, or the like.

Consider the following example. In certain embodiments, the identifiable event determination system 320 may determine that a party has experienced one or more events associated with substantially negative sentiment. For example, the identifiable event determination system 320 may determine, from one or more aggregated pieces of user generated data (e.g., social media site status updates, blog posts, and the like) that the party is unhappy about not being accepted to a particular college. Accordingly, in certain embodiments the output provision system 340 may configured to provide content suggestions associated with positive sentiment in order to encourage the party. For instance, in certain embodiments, the output provision system 340 may be provide the party with a set of content suggestions including the film It's a Wonderful Life, which may be associated with substantially positive sentiment.

In certain embodiments, the feedback system 350 may be configured to receive feedback data from a user regarding the set of content suggestions. The user ratings module 351 may be configured to provide a user interface that allows the user to submit quantitative and qualitative evaluations of the set of content suggestions. For example, in certain embodiments, the user may submit a user rating of "8.4 out of 10 stars" for a particular item of the set of content suggestions, as well as a comment including the opinions of the user regarding the particular item. In certain embodiments, the decision parameter definition module 352 may be configured to aggregate a set of user ratings and use them to determine a decision parameter to refine the process of identifying content suggestions for the user.

Figure 4:
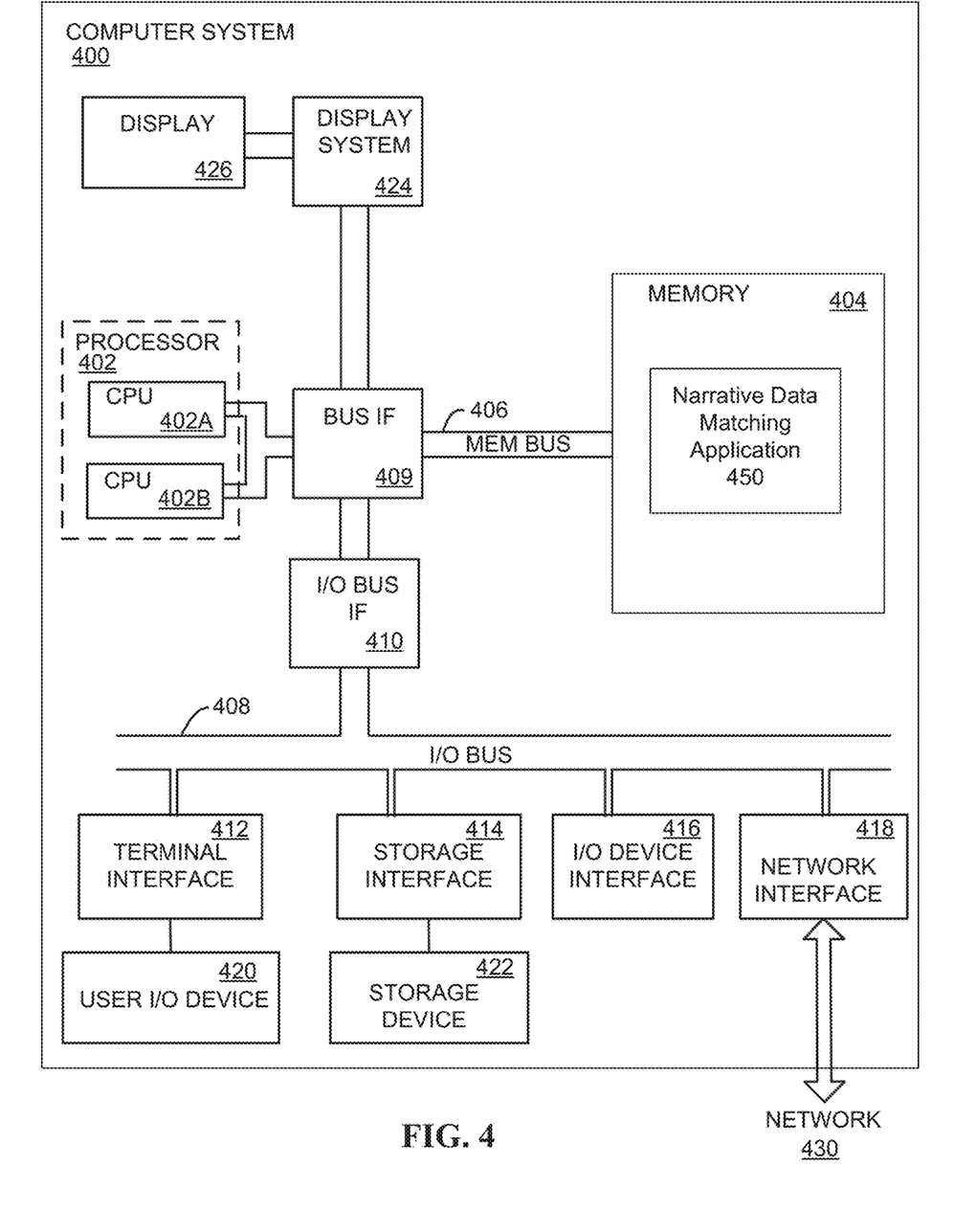
FIG. 4 depicts a high-level block diagram of a computer system for implementing various embodiments, according to embodiments.

FIG. 4 depicts a high-level block diagram of a computer system 400 for implementing various embodiments. The mechanisms and apparatus of the various embodiments disclosed herein apply equally to any appropriate computing system. The major components of the computer system 400 include one or more processors 402, a memory 404, a terminal interface 412, a storage interface 414, an I/O (Input/Output) device interface 416, and a network interface 418, all of which are communicatively coupled, directly or indirectly, for inter-component communication via a memory bus 406, an I/O bus 408, bus interface unit 409, and an I/O bus interface unit 410.

The computer system 400 may contain one or more general-purpose programmable central processing units (CPUs) 402A and 402B, herein generically referred to as the processor 402. In embodiments, the computer system 400 may contain multiple processors; however, in certain embodiments, the computer system 400 may alternatively be a single CPU system. Each processor 402 executes instructions stored in the memory 404 and may include one or more levels of on-board cache.

In embodiments, the memory 404 may include a random-access semiconductor memory, storage device, or storage medium (either volatile or non-volatile) for storing or encoding data and programs. In certain embodiments, the memory 404 represents the entire virtual memory of the computer system 400, and may also include the virtual memory of other computer systems coupled to the computer system 400 or connected via a network. The memory 404 can be conceptually viewed as a single monolithic entity, but in other embodiments the memory 404 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 404 may store all or a portion of the various programs, modules and data structures for processing data transfers as discussed herein. For instance, the memory 404 can store a narrative data matching application 450. In embodiments, the narrative data matching application 450 may include instructions or statements that execute on the processor 402 or instructions or statements that are interpreted by instructions or statements that execute on the processor 402 to carry out the functions as further described below. In certain embodiments, the narrative data matching application 450 is implemented in hardware via semiconductor devices, chips, logical gates, circuits, circuit cards, and/or other physical hardware devices in lieu of, or in addition to, a processor-based system. In embodiments, the narrative data matching application 450 may include data in addition to instructions or statements.

The computer system 400 may include a bus interface unit 409 to handle communications among the processor 402, the memory 404, a display system 424, and the I/O bus interface unit 410. The I/O bus interface unit 410 may be coupled with the I/O bus 408 for transferring data to and from the various I/O units. The I/O bus interface unit 410 communicates with multiple I/O interface units 412, 414, 416, and 418, which are also known as I/O processors (IOPs) or I/O adapters (IOAs), through the I/O bus 408. The display system 424 may include a display controller, a display memory, or both. The display controller may provide video, audio, or both types of data to a display device 426. The display memory may be a dedicated memory for buffering video data. The display system 424 may be coupled with a display device 426, such as a standalone display screen, computer monitor, television, or a tablet or handheld device display. In one embodiment, the display device 426 may include one or more speakers for rendering audio. Alternatively, one or more speakers for rendering audio may be coupled with an I/O interface unit. In alternate embodiments, one or more of the functions provided by the display system 424 may be on board an integrated circuit that also includes the processor 402. In addition, one or more of the functions provided by the bus interface unit 409 may be on board an integrated circuit that also includes the processor 402.

The I/O interface units support communication with a variety of storage and I/O devices. For example, the terminal interface unit 412 supports the attachment of one or more user I/O devices 420, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 420 and the computer system 400, and may receive output data via the user output devices. For example, a user interface may be presented via the user I/O device 420, such as displayed on a display device, played via a speaker, or printed via a printer.

The storage interface 414 supports the attachment of one or more disk drives or direct access storage devices 422 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 422 may be implemented via any type of secondary storage device. The contents of the memory 404, or any portion thereof, may be stored to and retrieved from the storage device 422 as needed. The I/O device interface 416 provides an interface to any of various other I/O devices or devices of other types, such as printers or fax machines. The network interface 418 provides one or more communication paths from the computer system 400 to other digital devices and computer systems; these communication paths may include, e.g., one or more networks 430.

Although the computer system 400 shown in FIG. 4 illustrates a particular bus structure providing a direct communication path among the processors 402, the memory 404, the bus interface 409, the display system 424, and the I/O bus interface unit 410, in alternative embodiments the computer system 400 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 410 and the I/O bus 408 are shown as single respective units, the computer system 400 may, in fact, contain multiple I/O bus interface units 410 and/or multiple I/O buses 408. While multiple I/O interface units are shown, which separate the I/O bus 408 from various communications paths running to the various I/O devices, in other embodiments, some or all of the I/O devices are connected directly to one or more system I/O buses.

In various embodiments, the computer system 400 is a multi-user mainframe computer system, a single-user system, or a server computer or similar device that has little or no direct user interface, but receives requests from other computer systems (clients). In other embodiments, the computer system 400 may be implemented as a desktop computer, portable computer, laptop or notebook computer, tablet computer, pocket computer, telephone, smart phone, or any other suitable type of electronic device.

FIG. 4 depicts several major components of the computer system 400. Individual components, however, may have greater complexity than represented in FIG. 4, components other than or in addition to those shown in FIG. 4 may be present, and the number, type, and configuration of such components may vary. Several particular examples of additional complexity or additional variations are disclosed herein; these are by way of example only and are not necessarily the only such variations. The various program components illustrated in FIG. 4 may be implemented, in various embodiments, in a number of different manners, including using various computer applications, routines, components, programs, objects, modules, data structures, etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for cognitive matching of narrative data, the method comprising:
    collecting a set of unstructured data that describes background information of a person;
    parsing, by a natural language processing technique configured to automatically analyze semantic and syntactic content, the set of unstructured data to obtain a set of parsed data;
    determining, by analyzing the set of parsed data, an identifiable event for the person, the identifiable event corresponding to a notable occurrence in the person's life, wherein determining, by analyzing the set of parsed data, the identifiable event includes:
        extracting a set of user feedback data from a social media website of the set of parsed data;
        analyzing the set of user feedback data from the social media website to determine indications of interactions from a plurality of users on the social media website;
        determining a prominence factor based on the indications of interactions from the plurality of users on the social media website, wherein the prominence factor indicates a level of significance of the identifiable event; and
        ascertaining that the prominence factor of the set of data achieves a prominence criterion, the prominence criterion being a threshold prominence value used to indicate whether the identifiable event corresponds to the notable occurrence in the person's life;
    identifying, using the identifiable event, a character within a fictional story from narrative content of a corpus based on an ontological relationship between the character of the fictional story and the identifiable event, the narrative content including media content;
    linking the identifiable event to the character of the fictional story using the ontological relationship;
    inferring, by the natural language processing technique, an emotion sentiment feature coupled with the character of the fictional story, wherein the emotion is not stated explicitly within the fictional story;
    matching the person to the character of the fictional story based on a particular set of elements from the set of data corresponding to the emotion sentiment feature coupled with the character of the fictional story;
providing the character of the fictional story as an output to a device of the person;
receiving a set of user ratings for the output; and
defining, using a machine learning technique configured to process the set of user ratings for the output, a decision parameter for identifying the character of the fictional story.

2. The method of claim 1, wherein the background information includes one or more units of information selected from a group consisting of: experiences, occupation, hobbies, interests, and education relating to the person.

3. The method of claim 1, wherein the set of data includes a status update and picture from a social media website account of the person.

* * * * *